March 30, 1965 A. W. SIMMONS ETAL 3,175,870
CONTROL RESERVOIR PRESSURE RELEASE AND CHARGING VALVE DEVICE
Filed Jan. 4, 1963 2 Sheets-Sheet 2
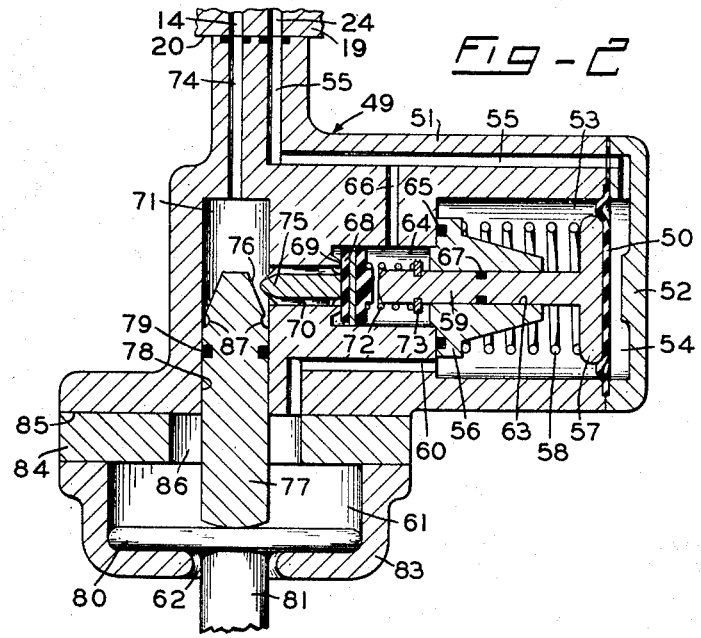
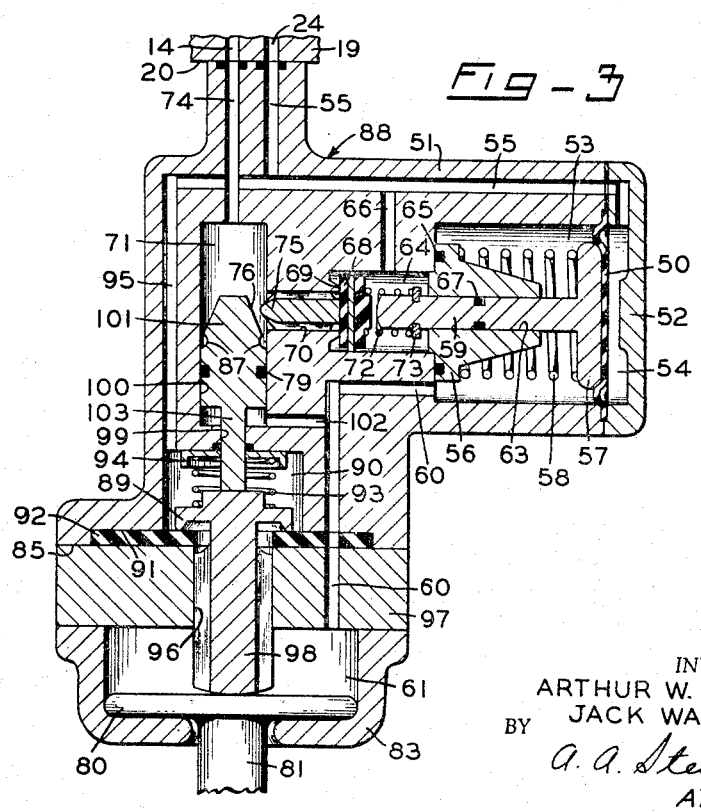
INVENTORS
ARTHUR W. SIMMONS
JACK WASHBOURN
BY
ATTORNEY United States Patent Office 3,175,870
Patented Mar. 30, 1965

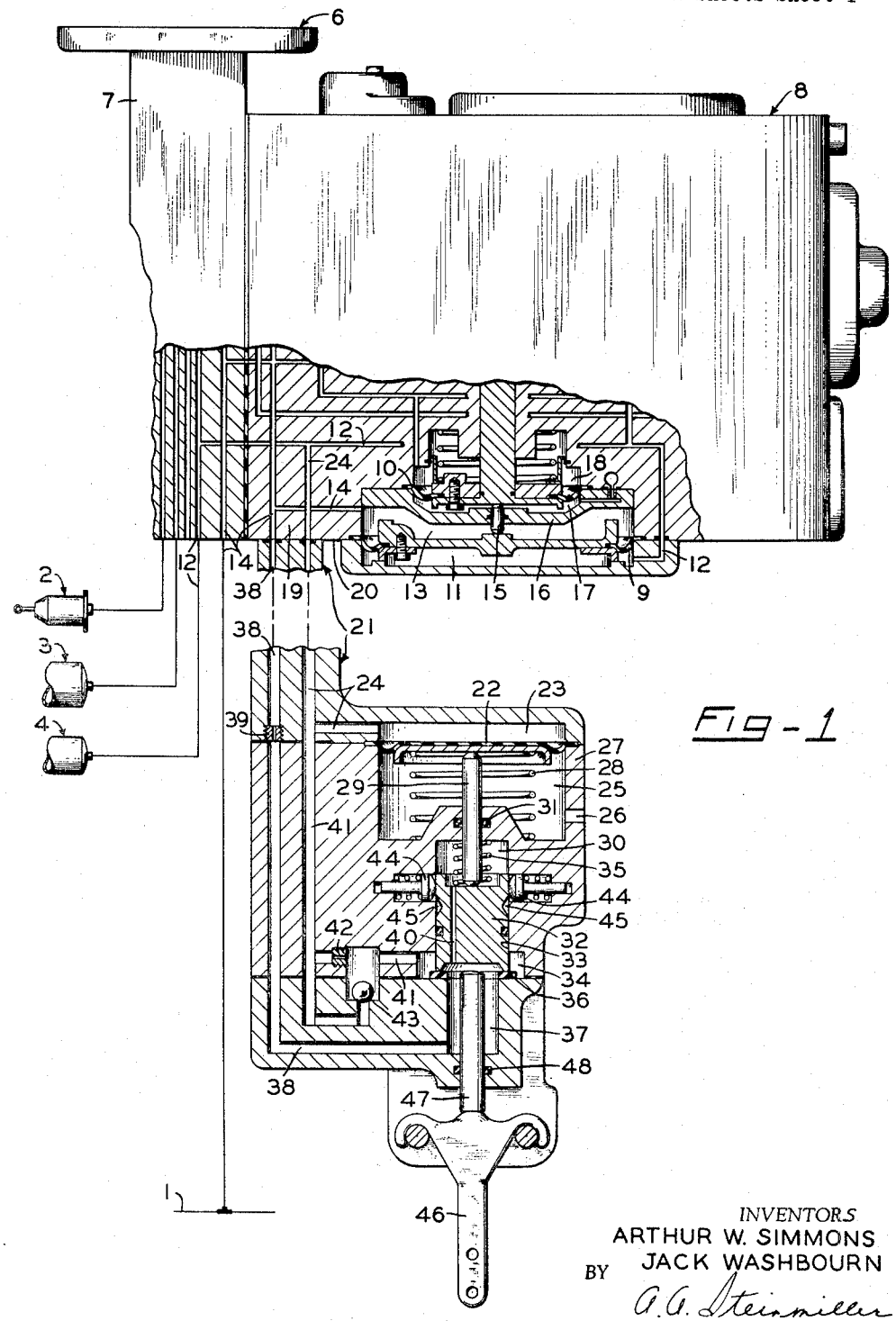

3,175,870
CONTROL RESERVOIR PRESSURE RELEASE AND CHARGING VALVE DEVICE
Arthur W. Simmons and Jack Washbourn, London, England, assignors to Westinghouse Brake & Signal Company, Ltd., London, England
Filed Jan. 4, 1963, Ser. No. 249,456
Claims priority, application Great Britain, Jan. 17, 1962, 1,771/62
17 Claims. (Cl. 303—74)

This invention relates to a combined control reservoir charging and release valve device suitable for use in graduated release type fluid pressure brake equipment for railway cars and the like to enable automatic initial rapid charging of the control reservoir upon coupling of the car into a train and manual operation to effect an equalization of control reservoir and brake pipe pressure to cause a release of the brakes on the car or to effect irrespective of the pressure in the brake pipe only a release of fluid under pressure from the control reservoir to atmosphere.

Control reservoir release valve devices heretofore employed usually comprised valve means normally biased to a so-called closed position to close communication between the control reservoir and atmosphere to maintain a substantially constant pressure in the control reservoir as a brake control valve device of the graduated release type, with which the control reservoir release valve device is associated, operates to effect a graduated brake application and subsequently a graduated brake release. The valve means of the conventional control reservoir release valve device is manually actuable to a release position to effect venting of fluid under pressure from the control reservoir to atmosphere to reduce the pressure in the control reservoir to any desired degree whereupon the brake control valve device associated with the control reservoir release valve device operates in response to this reduction in the pressure in the control reservoir to effect a corresponding reduction in the pressure in a brake cylinder device.

The general purpose of this invention is to provide a control reservoir release valve device that can be manually operated, while an emergency brake application is in effect due to the brake pipe being depleted of fluid under pressure, to vent fluid under pressure from the control reservoir to atmosphere via the depleted brake pipe to cause the brake control valve device to operate to effect a partial or a complete brake release or that can be manually operated, while a partial or full service application of the brakes is in effect, to effect an equalization of pressures between the control reservoir and the brake pipe to cause the brake control valve device to operate to effect a complete brake release.

This invention comprises a novel reservoir release valve device manually operable to connect a control reservoir to a brake pipe irrespective of the pressure in the brake pipe, this novel reservoir release valve also serving as a control reservoir charging check valve device for controlling one-way flow of fluid under pressure from the brake pipe to the control reservoir in response to an increase in brake pipe pressure above control reservoir pressure so long as control reservoir pressure is less than a chosen value.

In the accompanying drawings:

FIG. 1 is a diagrammatic view, partly in section, showing a brake control valve device for a railway car embodying the invention and comprising a service valve device to which is secured a novel balanced control reservoir release valve device that also serves as a control reservoir charging check valve.

FIG. 2 is a vertical cross-sectional view, showing a second embodiment of a novel control reservoir release valve device for use with the service valve device shown in FIG. 1, but in which the control reservoir release valve that also serves as a control reservoir charging check valve is subject on one side to brake pipe pressure and on the opposite side to control reservoir pressure.

FIG. 3 is a vertical cross-sectional view showing a third embodiment of a novel control reservoir release valve device for use with the service valve device shown in FIG. 1 comprising a control reservoir charging check valve and a separate but cooperating manually operable valve for releasing fluid under pressure from the control reservoir to atmosphere.

Description

Referring to FIG. 1 of the drawings, the railway car fluid pressure brake system embodying the invention comprises a brake pipe 1 that extends from end to end of the car, a brake cylinder device 2, an auxiliary reservoir 3, a control reservoir 4 and a brake control device 6 connected to the brake pipe 1.

The brake control valve device 6 may be substantially the same as that disclosed in United States Patent No. 2,937,906, issued May 24, 1960, to Harry C. May and assigned to the assignee of the present application, and in view of this it is deemed unnecessary to describe this device in detail. Briefly, however, the brake control valve device 6 comprises a pipe bracket 7 to which is secured a service valve device 8.

The service valve device 8 comprises two coaxially arranged, spaced-apart movable abutments 9 and 10 of different effective areas which are cooperably, though not positively, connected to each other so as to form a diaphragm stack, as will be understood from subsequent descriptions. The large movable abutment 9 is subject on its lower side, as viewed in FIG. 1 of the drawing, to pressure of fluid in a chamber 11 constantly open to the control reservoir 4 via a passageway and pipe 12. The movable abutment 9 is subject on its upper side to pressure of fluid in a chamber 13 that is constantly connected to the brake pipe 1 via a passageway and pipe 14.

The movable abutment 9 is cooperably connected to the movable abutment 10 through the medium of a coaxially arranged, cylindrical pusher stem 15 having sealing, slidably guided contact with the wall of an aligned bore through a partition member 16 separating the chamber 13 from an atmospheric chamber 17 at the lower side of the movable abutment 10, said stem at its respective ends contacting the movable abutments 9 and 10. At the upper side of the movable abutment 10 is a chamber 18 which is connected to the brake cylinder device 2 as explained in detail in the hereinbefore-mentioned Patent No. 2,937,906.

The service valve device 8 has a casing section 19 provided on its lower end with a bolting face 20. Secured to the bolting face 20 of the casing section 19 by any suitable means (not shown) is a combined control reservoir charging and release valve device 21.

Referring now to FIG. 1, it will be seen that the combined control reservoir charging and release valve device 21 has a diaphragm 22 subject on one side to control reservoir pressure in a chamber 23 that is connected to the passageway 12 in the service valve device 8 by a passageway 24, and subject on its lower side to atmospheric pressure in a chamber 25 via a port 26 in a casing section 27 and to the force of a spring 28. The diaphragm 22 acts on a stem 29 which passes through a partition in the casing section 27 separating the chamber 25 from a chamber 30 and is sealed by O-ring seal 31. The lower end of the stem 29 abuts the upper end of a cylindrical type valve 32 that is slidably mounted in a bore 33 formed in the casing section 27 and connecting the chamber 30 to a chamber 34. Surrounding the stem 29 and interposed between the cylindrical type valve 32 and the upper end of the chamber 30 is a light spring 35 biasing cylindrical type valve 32 into contact with a resilient annular valve seat 36 to close communications between the chamber 34 and a chamber 37 that is connected by a passageway 38 to the passageway 14 in the service valve device 8, there being a choke 39 disposed in the passageway 38 to control the rate of flow therethrough. The cylindrical type valve 32 is provided with a passageway 40 extending longitudinally therethrough so that opposite ends of the cylindrical type valve 32 are subject to the same pressure thereby balancing this valve. The chamber 34 is connected by a passageway 41 to the passageway 24. Disposed in the passageway 41 is a choke 42 that has a ball check valve 43 connected in bypassing relation thereto. Since the chamber 37 is connected by the passageway 38 and the pipe and passageway 14 to the brake pipe 1, the inner seated area of the cylindrical type valve 32 is subject to brake pipe pressure which flows via the passageway 40 to chamber 30 thereby balancing the valve 32 since both ends of the cylindrical type valve 32 are subjected to brake pipe pressure. Carried in the casing section 27 are a pair of spring loaded detents 44 which are adapted to engage with corresponding recesses 45 formed in the cylindrical type valve 32, when it is lifted upward from the position in which it is shown in FIG. 1, to hold it in its uppermost position. Since the chamber 34 is connected to the control reservoir 4 via the passageway 41, choke 42, passageway 24 and pipe and passageway 12 while the cylindrical valve 32 occupies its upper position, the control reservoir 4 is charged from the brake pipe 1. The choke 42 is of sufficient size to provide for the proper rate of initial charging of the control reservoir.

A lever 46 is provided for, through the intermediary of a stem 47 which extends through the chamber 37, effecting unseating of the cylindrical type valve 32 from the resilient annular valve seat 36 when a manual pull is exerted on the lever 46. An O-ring seal 48 around the valve stem 47 provides a seal therewith and prevents leakage of fluid under pressure from the chamber 37 to the atmosphere.

*Operation*

Assume initially that a railway car provided with the brake equipment shown in FIG. 1 is coupled into a train and that this equipment is void of fluid under pressure. Consequently, in the absence of fluid under pressure, the various parts of the service valve device 8 and the combined control reservoir charging and release valve device 21 will occupy the position in which they are shown in FIG. 1. When a railway car is coupled into a train, fluid under pressure is supplied from the brake valve (not shown) on the locomotive to the brake pipe 1 from whence it flows to the chamber 13 above the diaphragm 9 of the service valve device 8 via the pipe and passageway 14. Whenever pressure is thus supplied to the pipe and passageway 14, it flows therefrom through the passageway 38 and choke 39 to the chamber 37 beneath the cylindrical type valve 32. In order that the control reservoir 4 be charged from the brake pipe 1, it is necessary that, at the time the car is coupled into the train, a trainman exerts a pull on the lever 46 to, through the intermediary of a stem 47, move the cylindrical type valve 32 upward from the position shown in FIG. 1 until the spring biased detents 44 move into the corresponding recesses 45. Subsequent to the detents 44 moving into the recesses 45, these detents will maintain the cylindrical type valve 32 in an upper unseated position so that the trainman may release his grip on the lever 46. While the cylindrical type valve 32 occupies its upper position in which the lower end thereof is unseated from the resilient annular valve seat 36, a communication is established between the chamber 37 and the chamber 34. Therefore, fluid under pressure supplied to the chamber 37 from the brake pipe 1 will flow to the control reservoir 4 via the chamber 34, passageway 41, choke 42, passageway 24 and passageway and pipe 12.

The fluid under pressure supplied from the brake pipe to the control reservoir 4, as just described, also flows to the chamber 23 above the diaphragm 22 via the passageway 24. The pressure will thus build up in the control reservoir 4 and the chamber 23 until the pressure in the chamber 23 attains the value of the spring 28, whereupon the diaphragm 22 will be moved downward against the yielding resistance of the spring 28. This downward deflection of the diaphragm 22 acts through the intermediary of the stem 29 to push the cylindrical type valve 32 downward until it contacts the resilient annular valve seat 36, it being understood that the detents 44 move out of the recesses 45 in response to the downward force applied to the cylindrical valve 32 through the stem 29. Subsequent to the seating of the cylindrical valve 32 on the resilient annular valve seat 36, the final charging of the control reservoir 4 takes place through a conventional final charging choke (not shown) usually located in the body of the control valve device 6. Now let it be assumed that when the brake pipe 1 is charged, the pressure therein has been increased excessively for some reason, that the control reservoir 4 has become overcharged, and that the brake cylinder pressure in the brake cylinder device 2 is such that the brakes will not fully release.

To release this excess pressure in the control reservoir 4, a trainman will exert a pull on the lever 46 to, through intermediary of the stem 47, lift the cylindrical valve 32 from its resilient annular seat 36 against the yielding resistance of the spring 35 and also the excessive control reservoir pressure acting in the chamber 23 on the diaphragm 22, which excessive pressure is exerted through the stem 29 on the cylindrical type valve 32.

As heretofore described, when the cylindrical type valve 32 is moved upward, the spring biased detents 44 move into the recesses 45 to maintain the cylindrical type valve 32 in an upper position so that the trainman may release the lever 46. With the cylindrical type valve 32 now in its upper position, the excess pressure in the control reservoir 4 will flow therefrom to the brake pipe 1 and the chamber 13 above the diaphragm 9 of the service valve device 8 via pipe and passageway 12, passageway 24, passageway 41, past the ball check valve 43 which is unseated by this flow, chamber 34, chamber 37, passageway 38, choke 39 and passageway and pipe 14. This flow from the control reservoir 4 to the brake pipe 1 is effective to equalize the pressures in the chambers 11 and 13 respectively below and above the diaphragm 9 whereupon the service valve device 8 operates in response to this equalization of pressure to move to its release position to completely release fluid under pressure from the brake cylinder device 2.

It may be noted, however, that if the pressure in the control reservoir 4 and the chamber 23 is high enough to overcome the spring bias of the detents 44, the trainman must not release the lever 46 until the brakes are completely released on the car. If the lever 46 were released while the pressure in the control reservoir 4 and chamber 23 is still high enough to overcome the spring bias of the detent 44, the control reservoir pressure acting in the chamber 23 would deflect the diaphragm 22 downward and, through the intermediary of the stem 29, move the cylindrical type valve 32 downward to the position shown in FIG. 1 in which the lower end thereof contacts the resilient annular valve seat 36, thus closing communication between the chambers 37 and 34 and preventing further flow of fluid under pressure from the control reservoir 4 to the brake pipe 1. From the foregoing, it is apparent that when operating the combined control reservoir charging and release valve device 21 to effect the equalization between the pressure in the control reservoir 4 and the pressure in the brake pipe 1, it is necessary that a trainman, through the lever 46 and the stem 47, maintain the cylindrical type valve 32 in its upper position until the pressure in the control reservoir has been reduced to a chosen value.

Let it now be supposed that a railway car provided with the brake equipment shown in FIG. 1 has been uncoupled from a train and set off on a siding. When a car is set off on a siding, fluid under pressure is completely vented from the brake pipe 1 so that the pressure therein is atmospheric pressure. As is well known, when the brake pipe is completely depleted of fluid under pressure an emergency application of the brakes on the car is effected.

Now let it be supposed that a car is sitting on a siding, the brakes of which have been applied in an emergency, and it is wished to release the brakes completely. To effect a release of the emergency brake application, a trainman will exert a pull on the lever 46 to, through the intermediary of the stem 47, move the cylindrical type valve 32 to its upper position. Fluid under pressure will now flow from the control reservoir 4 and the chamber 23 to atmosphere via pipe and passageway 12, passageway 24, passageway 41, ball check valve 43, chamber 34, chamber 37, passageway 38, choke 39, passageway and pipe 14, and brake pipe 1 which at each end of the car is open to the atmosphere, it being assumed that the angle cocks at the respective opposite ends of the car are open.

This flow of fluid under pressure from the chamber 23 to atmosphere quickly reduces the pressure on the upper side of the diaphragm 22 and enables the spring 28 to remove any downwardly force exerted by the diaphragm 22 through the stem 29 on the valve 32.

Since it is assumed that the trainman is still exerting a pull on the lever 46, this force applied through the intermediary of the stem 47 will move the cylindrical type valve 32 upward until the spring biased detents 44 move into the corresponding recesses 45 in the cylindrical type valve 32 since, as hereinbefore stated, the spring 35 is a light spring and therefore is of insufficient force to overcome the resistance of the spring biased detents 44. Therefore, after the pressure in the chamber 23 has been reduced to such a value that the spring biased detents 44 are able to maintain the cylindrical type valve 32 in its upper position, the trainman may release the lever 46 whereupon the cylindrical type valve 32 will remain in its upper position until the brake pipe is recharged. With the valve 32 in its upper position fluid under pressure can flow from the control reservoir to the brake pipe which, as hereinbefore stated, is open to atmosphere at both ends of the car, via the pipe and passageway 12, passageway 24, passageway 41, past ball check valve 43, chamber 34, past the now open cylindrical type valve 32, chamber 37, passageway 38, choke 39 and passageway and pipe 14.

It will thus be appreciated that with the combined control reservoir charging and release valve device 21 shown in FIG. 1 of the drawings, a rapid initial control reservoir charging can be obtained if the cylindrical type valve 32 has been previously moved to its upper position by a trainman exerting a manual pull on the lever 46. The control reservoir 4 can be thus charged from the brake pipe 1 until the pressure in the chamber 23 overcomes the spring 28, whereupon the diaphragm 22 deflects downwardly to effect reseating of the cylindrical type valve 32 on its resilient annular valve seat 36 so that final charging of the control reservoir must be effected through the hereinbefore-mentioned final charging choke.

To obviate the necessity of a trainman first manually moving the control reservoir charging and release valve to an open position in order to effect the supply of fluid under pressure from the brake pipe 1 to the control reservoir 4 to charge this reservoir, it may be preferred to make use of a modified construction of a combined control reservoir charging and release valve device as is shown in FIG. 2 which constitutes a second embodiment of the invention that will now be described in detail.

Description—FIG. 2

FIG. 2 of the drawings shows a second embodiment of a combined control reservoir charging and release valve device 49 comprising the invention. The combined control reservoir charging and release valve device 49 shown in FIG. 2 is similar to the combined control reservoir charging and release valve device 21 shown in FIG. 1 in that it comprises a diaphragm 50, the outer periphery of which is clamped between a casing section 51 of the combined control reservoir charging and release valve device 49 and a cover 52 to form respectively on the opposite sides of the diaphragm 50 chambers 53 and 54. The chamber 54 is connected by a passageway 55 to the hereinbefore-mentioned passageway 24 in the service valve device 8 which passageway, as shown in FIG. 1, is connected to the passageway 12 one end of which opens into the chamber 11 below the diaphragm 9 and the opposite end of which is connected by a pipe bearing the same numeral to the control reservoir 4. Disposed in the chamber 53 and interposed between a spring seat 56 and a diaphragm follower 57 is a spring 58 that surrounds a stem 59 that is integral with the diaphragm follower 57. The chamber 53 is always open to atmosphere through a passageway 60 that opens into a chamber 61, the bottom of which is provided with an opening 62. The spring seat 56 is provided with a bore 63 through which the stem 59 extends into a chamber 64 formed in the casing section 51. The spring seat 56 is provided with an O-ring seal 65 to prevent leakage of fluid under pressure from the chamber 64, which is connected to the passageway 55 via a passageway 66, to the atmospheric chamber 53. The stem 59 is provided with a peripheral annular groove in which is disposed an O-ring seal 67 to prevent leakage of fluid under pressure from the chamber 64 along the stem 59 to the atmospheric chamber 53.

Disposed in the chamber 64 is a flat disc type valve 68 which is biased against an annular valve seat 69 formed at the right-hand end of a bore 70 that connects the chamber 64 to a chamber 71 by a light spring 72 interposed between the flat disc valve 68 and a snap ring 73 that is inserted in a groove formed in the stem 59. Extending through the casing section 51 is a passageway 74 one end of which opens into the chamber 71 and the opposite end of which registers with the passageway 14 that opens at the bolting face 20 of the service valve device 8. Since the passageway and pipe 14 are connected to the brake pipe 1, as shown in FIG. 1, fluid under pressure is supplied from the brake pipe 1 to the chamber 71 so that the left-hand side of flat disc type valve 68 is subject to brake pipe pressure and the right-hand side is subject to control reservoir pressure plus the pressure of the spring 72 since, as hereinbefore mentioned, the chamber 64 is connected to the control reservoir 4 via passageway 66, passageway 55, passageway 24, and passageway and pipe 12. Slidably mounted in the bore 70 and disposed on the left-hand side of the flat disc type valve 68 is a fluted stem 75. The fluted stem 75 may be separate from or formed integral with the flat disc type valve 68 and has its left-hand end disposed in the chamber 71 so as to be in the path of a cam surface 76 formed on the upper end of a stem 77 slidably mounted in a bore 78 extending between the chambers 71 and 61. In order to prevent leakage of fluid under pressure from the chamber 71 to the chamber 61 the stem 77 is provided with a peripheral annular groove in which is disposed an O-ring seal 79. While the stem 77 occupies the position in which it is shown in FIG. 2, the lower end thereof abuts a flange 80 from the lower side of which extends through the opening 62 a manually operable lever 81 that is similar to the lever 46 shown in FIG. 1 of the drawing.

In order to facilitate assembly of the manually operable lever 81, the chamber 61 in which the flange 80 of the lever 81 is disposed is formed in a cup-shaped member 83 which is secured by any suitable means (not shown) to a flat plate 84, the upper side of which is secured to a flat surface 85 formed on the lower side of the casing section 51 by any suitable means (not shown). The flat plate 84 is provided with an opening 86 which is of sufficient size so as to register with the end of the bore 78 and the end of the passageway 60 that open at the flat surface 85.

Operation—FIG. 2

Assuming now that the combined control reservoir charging and release valve device 49 is secured to the bolting face 20 of the service valve device 8 in place of the combined control reservoir charging and release valve device 21 shown in FIG. 1; let it be supposed that a railway car provided with this equipment is coupled into a train and the angle cocks at the opposite ends thereof are open. Fluid under pressure supplied to the brake pipe 1 from the brake valve on the locomotive will now flow via pipe and passageway 14 (FIG. 1) and passageway 74 (FIG. 2) to the chamber 71. Fluid under pressure thus supplied from the brake pipe 1 to the chamber 71 flows through the bore 70 to act on the left-hand face of the flat disc type valve 68 and move it out of contact with the annular valve seat 69 in the direction of the right hand against the yielding resistance of the spring 72 thereby establishing a communication between the chamber 71 and the chamber 64. Fluid under pressure will now flow from the chamber 71 to the chamber 64 and thence to the control reservoir 4 via passageway 66, passageway 55, passageway 24, and passageway and pipe 12. Since, as shown in FIG. 2, the passageway 55 is connected to the chamber 54, fluid under pressure thus supplied from the brake pipe 1 to the control reservoir 4 will also flow to the chamber 54.

Chraging of the control reservoir 4 and the chamber 54 will continue in the manner above described until the pressure in the chamber 54 has been increased to a value sufficient to deflect the diaphragm 50 against the yielding resistance of the spring 58. This deflection of the diaphragm 50 in the direction of the left hand, as shown in FIG. 2, moves the stem 59 in the direction of the left hand to compress the light spring 72 until the left-hand end of the stem 59 contacts the right-hand side of the flat disc valve 68 after which continued movement of the stem 59 in the direction of the left hand will move the flat disc valve 68 into contact with the annular valve seat 69. When the flat disc valve 68 is thus moved into contact with the annular valve seat 69, further flow from the brake pipe 1 to the control reservoir 4 is cut off except through the hereinbefore-mentioned final charging choke.

Let it now be supposed that a service brake application has been made in which the brake pipe pressure has been reduced below the pressure in the control reservoir, and a trainman desires to release the brakes. To operate the combined reservoir charging and release valve device 49 as a brake release valve, the trainman will exert a manual pull on the lever 81 so that the flange 80 is tilted upward. This causes the stem 77 to move upward so that the cam surface 76 on the end of the stem 77 is first brought into contact with the left-hand end of the fluted stem 75. Continued upward movement of the stem 77 will cause the cam surface 76 to push the fluted stem 75 in the direction of the right hand and thereby move flat disc valve 68 away from the annular seat 69. Consequently, upon unseating of the valve 68 from the annular valve seat 69, the control reservoir 4 is connected to the chamber 13 in the service valve device 8 via pipe and passageway 12, passageway 24, passageway 55, passageway 66, chamber 64, past unseated flat disc valve 68, bore 70, chamber 71, passageway 74 and passageway 14. As shown in FIG. 1, the control reservoir 4 is connected to the chamber 11 in the service valve device 8 via the pipe and passageway 12. Consequently, fluid under pressure will now equalize in the chambers 11 and 13 and on opposite sides of the diaphragm 9 and thereby cause the service valve device 8 to effect a complete release of the brake application.

If, as has been supposed, prior to operation of the combined control reservoir charging and release valve 49, a partial or full service brake application had been effected, reduced brake pipe pressure would be present in the chamber 71. Therefore, as soon as the trainman released the lever 81, brake pipe pressure present in the chamber 71 would act on the stem 77 to move it downward to the position in which it is shown in FIG. 2. If the stem 77 were thus moved downward, the spring 72 would be rendered effective to seat the valve 68 on the annular valve seat 69 thereby closing communication between the control reservoir 4 and the brake pipe 1. It is thus apparent that if a brake release is effected subsequent to a service brake application, the trainman must exert a pull on the lever 81 to maintain the flat disc valve 68 unseated until the equalization between the control reservoir and brake pipe pressure occurs.

Now let it be supposed that a car has been set off on a siding, that the brake pipe pressure has been reduced to atmospheric pressure, that an emergency application of brakes has been effected on the car, and that a trainman desires to release the brakes on the car. To do so he will exert a pull on the lever 81 to thereby move the stem 77 upward so that the cam surface 76 is brought into contact with the left-hand end of the stem 75, after which continued upward movement of the stem 77 will effect unseating of the flat disc valve 68 from the annular valve seat 69 in the manner hereinbefore described. The stem 77 is provided at the end of the cam surface 76 with a recess 87. Therefore, when the stem 77 has been moved up far enough for the end of the stem 75 to pass the end of the cam surface 76, spring 72 will be effective through the intermediary of flat disc valve 68 to bias the left-hand end of the stem 75 into engagement with the recess 87 in the stem 77. Since the pressure in the brake pipe has been reduced to atmospheric pressure, atmospheric pressure will be present in the chamber 71. Therefore, when the trainman releases the handle 81, stem 77 will remain in its upper position to hold the flat disc valve 68 unseated from the annular seat 69 thus permitting a complete venting of the control reservoir 4 to atmosphere via brake pipe 1.

It is therefore apparent from FIG. 2 that when venting the control reservoir 4 subsequent to an emergency brake application, the trainman need only exert a pull on the lever 81 to move the stem 77 up far enough for the end of the stem 75 to enter the recess 87 after which he may release the lever 81.

It will be noted from FIGS. 1 and 2 that in order to reduce the pressure in the control reservoir 4, it is vented into the brake pipe 1. Should it be required to vent the control reservoir to atmosphere when discharging fluid under pressure from an overcharged control reservoir at a time when the brake pipe 1 is fully charged, it is convenient to make use of a still further modified form of combined control reservoir charging and release valve device which will now be described.

Description—FIG. 3

FIG. 3 of the drawings shows a third embodiment of a combined control reservoir charging and release valve device 88 comprising the invention. Combined control reservoir charging and release valve device 88 is identical in construction to the combined control reservoir charging and release valve device 49 shown in FIG. 2 except the stem operated by the manually operated lever is different in form than the stem 77 shown in FIG. 2 and a valve 89 is interposed between the lever and the stem.

Since the combined control reservoir charging and release valve device 88 shown in FIG. 3 and the combined control reservoir charging and release valve device 49 shown in FIG. 2 are identical in construction, except as pointed out above, for convenience, corresponding parts of the two combined control reservoir charging and release valves are identified by the same reference numerals without additional descriptions.

As shown in FIG. 3 the casing section 51 is modified to provide a chamber 90 in which the valve 89 is disposed. The surface 85 formed on the lower end of the casing section 51 is provided with a recess 91 in which is disposed a resilient annular valve seat 92 against which the valve 89 is urged by spring 93 disposed between the valve 89 and a spring seat 94 that rests against the upper wall of the chamber 90. The chamber 90 is connected to the passageway 55 via a passageway 95 formed in the casing section 51 so that the control reservoir pressure is present in the chamber 90 and acts on top of the valve 89 to normally bias it into seating contact with the annular valve seat 92 to close communication between the chamber 90 and the atmospheric chamber 61 via a bore 96 extending through a flat plate 97 that is interposed between the cup-shaped member 83 and the casing section 51 in place of the flat plate 84 shown in FIG. 2.

Extending from the lower side of the valve 89 is a stem 98, the length of which is such that when the valve 89 is seated the lower end thereof contacts the flange 80 as shown in FIG. 3.

Formed in the casing section 51 and opening into the chamber 90 is a bore 99, the upper end of which opens into a coaxial counterbore 100, the upper end of which counterbore opens into the chamber 71. Slidably mounted in the counterbore 100 is a stem 101, the upper end of which is similar to the stem 77 in that it is provided with the cam surface 76 and recess 87. The upper end portion of the stem 101 is provided with a peripheral annular groove for receiving the O-ring seal 79 which prevents leakage of fluid under pressure from the chamber 71 to the lower end of the counterbore 100 which is open to atmosphere via a passageway 102 that connects the lower end of the counterbore 100 to the passageway 60 which extends through the casing section 51 and the flat plate 97 to connect the chamber 53 to the atmospheric chamber 61. The lower end of the stem 101 is provided with a reduced portion 103 which extends through the bore 99 into the chamber 90 and is of such length that the lower end thereof abuts the upper side of the valve 89 when this valve is seated, as shown in FIG. 3. Providing the stem 101 with the reduced portion 103 and connecting the lower end of the counterbore 100 to atmosphere, as explained above, ensures that the presence of brake pipe pressure in the chamber 71 above the stem 101 is able to push the stem 101 downward even though there may be control reservoir pressure in the chamber 90 and above the valve 89.

*Operation—FIG. 3*

When the combined control reservoir charging and release valve device 88 is secured to the bolting face 20 of the service valve device 8 shown in FIG. 1 in place of the combined control reservoir charging and release valve device 49 shown in FIG. 2, charging of the control reservoir 4 from the brake pipe 1 is identical with charging of the control reservoir when the combined control reservoir charging and release valve device 49 shown in FIG. 2 is used.

Let it be supposed that the control reservoir 4 has been overcharged, that the brake pipe 1 is charged to its normal charged value, and that a trainman desires to discharge fluid under pressure from the overcharged control reservoir 4. To do so, the trainman will exert a pull on the lever 81 shown in FIG. 3 to tilt the flange 80 about its edge and thereby move the stem 98 and valve 89 upward from the position in which they are shown in FIG. 3 so that the valve 89 is unseated from the resilient annular valve seat 92. As the valve 89 and stem 98 are moved upward, the reduced portion 103 on the stem 101 transmits this movement to the stem 101 so that it moves up also. It should be understood, however, that the lever 81 is not pulled far enough to move the stem 101 upward to the position in which the cam surface 76 will effect the unseating of the flat disc type valve 68. With the valve 89 unseated from the annular valve seat 92, fluid under pressure will flow from the control reservoir 4 to the atmosphere via pipe and passageway 12, passageway 24, passageway 55, passageway 95, chamber 90, past the now unseated valve 89, bore 96, and chamber 61. When the pressure in the control reservoir 4 has been reduced to the desired value, the trainman will release the lever 81. Since brake pipe pressure is now present in the chamber 71, this pressure will act on the upper end of the stem 101 to move it downward so that the reduced portion 103 on the lower end of the stem 101 acts on top of the valve 89 to move this valve downward into seating contact with the annular valve seat 92 to thereby cut off the flow of fluid under pressure from the control reservoir 4 to the atmosphere. It may be noted that the spring 93 is effective to assist the fluid under pressure in the chamber 71 in reseating the valve 89 on the annular valve seat 92. From the foregoing, it is apparent that a trainman can release fluid under pressure from the control reservoir 4 while brake pipe pressure is present in the chamber 71 so long as he exerts a pull on the lever 81 to hold the valve 89 unseated and that this valve will be reseated to cut off flow from the control reservoir 4 to atmosphere upon the trainman releasing the lever 81.

Let it be supposed that the trainman desires to completely release all the fluid under pressure in the control reservoir 4 to atmosphere. To do so he will exert a pull on the lever 81 and rock it far enough so that the stem 98, reduced portion 103 and stem 101 are moved up far enough for the end of the stem 75 to ride up the cam surface 76 and then be biased by the spring 72 into the recess 87 on the stem 101. Now if the trainman releases the lever 81, the spring 93 will reseat the valve 89. However, the valve 68 is now unseated so that the control reservoir pressure will equalize into the brake pipe 1, and if the car is set off on a side track with the angle cocks at each end of the brake pipe 1 open, all of the fluid under pressure in the control reservoir 4 will flow to atmosphere through the brake pipe.

Having now described the invention, what we claim as new and desire to secure by Letters Patent, is:

1. A combination including a brake pipe charged to a certain normal pressure, a control reservoir also charged to said normal pressure, and a brake control valve device of the type having a service valve for controlling the application and release of brakes according to variations effected in brake pipe pressure relative to the certain normal control reservoir pressure, said combination being characterized by a combined control reservoir charging and release valve device comprising:

(a) a normally seated valve effective when unseated to establish flow of fluid under pressure from the brake pipe to charge the control reservoir from the brake pipe, (b) means effective upon establishment of a chosen pressure in the control reservoir for biasing said valve to a position closing communication between the brake pipe and the control reservoir, and (c) manual means for opening said valve to cause a reduction in the pressure in the control reservoir by reverse flow therefrom to the brake pipe.

2. A combination including a brake pipe charged to a certain normal pressure, a control reservoir also charged to said normal pressure, and a brake control valve device of the type having a service valve for controlling the application and release of brakes according to variations effected in brake pipe pressure relative to the certain normal control reservoir pressure, said combination being characterized by a combined control reservoir charging and release valve device comprising:
(a) a normally seated valve effective when unseated to establish flow of fluid under pressure from the brake pipe to charge the control reservoir,
(b) fluid pressure responsive means subject to pressure established in the control reservoir and effective upon establishment of a pressure in the control reservoir exceeding a certain value for actuating said valve to a closed position to prevent further charging past said valve to the control reservoir, and
(c) manual means for opening said valve against the force exerted by the fluid pressure responsive means to cause a reduction in the pressure in the control reservoir by reverse flow to the brake pipe.

3. A combination including a brake pipe charged to a certain normal pressure, a control reservoir also charged to said normal pressure, and a brake control valve device of the type having a service valve for controlling the application and release of brakes according to variations effected in brake pipe pressure relative to the certain normal control reservoir pressure, said combination being characterized by a combined control reservoir charging and release valve device comprising:
(a) a normally seated valve effective when unseated to establish flow of fluid under pressure from the brake pipe to charge the control reservoir,
(b) fluid pressure responsive means subject to pressure established in the control reservoir and effective upon establishment of a pressure in the control reservoir exceeding a certain value for actuating said valve to a closed position to prevent further charging past said valve to the control reservoir,
(c) biasing means yieldingly resisting unseating of said valve, and
(d) manual means for opening said valve against the combined force exerted by said fluid under pressure responsive means and said biasing means to cause a reduction in the pressure in the control reservoir by reverse flow to the brake pipe.

4. A combination including a brake pipe charged to a certain normal pressure, a control reservoir also charged to said normal pressure, and a brake control valve device of the type having a service valve for controlling the application and release of brakes according to variations effected in brake pipe pressure relative to the certain normal control reservoir pressure, said combination being characterized by a combined control reservoir charging and release valve device comprising:
(a) a cylindrical type valve effective when unseated to establish flow of fluid under pressure from the brake pipe to charge the control reservoir from the brake pipe, said cylindrical type valve having a passageway extending longitudinally therethrough whereby the opposite ends of said valve are always subject to the same pressure,
(b) an annular valve seat for said valve,
(c) a movable abutment subject to pressure established in the control reservoir and responsive to a chosen pressure in the control reservoir for effecting seating of said valve on said annular valve seat to close communication between the brake pipe and the control reservoir to cut off charging of the control reservoir, and
(d) manual means for effecting unseating of said valve from said annular valve seat to establish a communication between the control reservoir and the brake pipe to cause a reduction in the pressure in the control reservoir by reverse flow to the brake pipe.

5. A combined control reservoir charging and release valve device as claimed in claim 4, further characterized by detent means for yieldingly holding said cylindrical type valve in its unseated position.

6. A combined control reservoir charging and release valve device as claimed in claim 4, further characterized by detent means for yieldingly holding said cylindrical type valve in its unseated position, and in that said detent means is operable to unlock said cylindrical type valve in response to control reservoir pressure acting on said movable abutment increasing to said chosen pressure.

7. A combined control reservoir charging and release valve device as claimed in claim 4, further characterized by a choke interposed between said cylindrical type valve and the control reservoir to control the rate of charging the control reservoir.

8. A combined control reservoir charging and release valve device as claimed in claim 4, further characterized by a choke interposed between said cylindrical type valve and the control reservoir to control the rate of charging the control reservoir, and by a check valve connected in by-passing relation to said choke whereby fluid under pressure may flow reversely from the control reservoir to the brake pipe at an unrestricted rate.

9. A combined control reservoir charging and release valve device as claimed in claim 4, further characterized by a first choke interposed between the brake pipe and said cylindrical type valve to control the rate of flow of fluid under pressure from the brake pipe to said cylindrical type valve, and by a second choke and a check valve connected in by-passing relation thereto interposed between said cylindrical type valve and the control reservoir, said second choke restricting the rate of flow of fluid under pressure in the direction from said cylindrical type valve to the control reservoir, and said check valve providing unrestricted flow in the direction from the control reservoir to said cylindrical type valve.

10. In a railway vehicle brake system of the type having a brake pipe charged to a certain normal pressure, a brake cylinder device, an auxiliary reservoir and a control reservoir each also charged to said normal pressure, and a brake control valve device having means for effecting charging the auxiliary reservoir from the brake pipe and being operable in response to a reduction in the pressure in the brake pipe relative to the pressure in the control reservoir to effect the supply of fluid under pressure from the auxiliary reservoir to the brake cylinder device, the combination characterized by a combined control reservoir charging and release valve device comprising:
(a) a normally seated check valve for controlling flow in the direction from the brake pipe to the control reservoir,
(b) an annular valve seat for said check valve,
(c) a stem disposed on one side of said check valve and extending through said annular valve seat,
(d) a movable abutment responsive to a chosen pressure in the control reservoir for effecting seating of said check valve on said annular seat to close communication between the brake pipe and the control reservoir,
(e) stem means operably contacting said stem to, through the intermediary thereof, effect unseating of said check valve from said annular valve seat, said stem means being subject at one end to the pressure in the brake pipe for effecting movement thereof in a direction away from said check valve to enable seating of said check valve, and
(f) manually operable means for effecting movement of said stem means in another direction from one position in which said check valve is seated to a second position in which said check valve is unseated.

11. The combination as claimed in claim 10, further characterized by a resilient means interposed between said movable abutment and said check valve, said resilient means providing relative movement of said movable abutment and said check valve each with respect to the other and also a biasing force acting in the direction to effect seating of said check valve on said annular valve seat.

12. The combination as claimed in claim 10, further characterized in that said one end of said stem means is provided with a cam surface movable into contact with the end of said stem opposite said check valve to effect unseating of said check valve, and in that said stem means has adjacent one end of said cam surface a recess for receiving said end of said stem opposite said check valve for, in the absence of brake pipe pressure acting on said stem means, locking said check valve in an unseated position.

13. The combination as claimed in claim 10, further characterized by latch means having a latch position for holding said check valve unseated and operable responsively to brake pipe pressure exceeding a chosen value to be moved to an unlatching position.

14. In a railway vehicle brake system of the type having a brake pipe charged to a certain normal pressure, a brake cylinder device, an auxiliary reservoir and a control reservoir each also charged to said certain normal pressure, and a brake control valve device having means for effecting charging of the auxiliary reservoir from the brake pipe and being operable in response to a reduction in the pressure in the brake pipe relative to the pressure in the cotnrol reservoir to effect the supply of fluid under pressure from the auxiliary reservoir to the brake cylinder device, the combination characterized by a combined control reservoir charging and release valve device comprising:
(a) a normally seated check valve for controlling flow in the direction from the brake pipe to the control reservoir,
(b) a first annular valve seat for said check valve,
(c) a stem subject at one end to brake pipe pressure and effective when moved a predetermined amount in a direction in opposition to brake pipe pressure to cause unseating of said check valve,
(d) a normally seated valve effective when unseated to cause release of fluid under pressure from the control reservoir to atmosphere, and
(e) manually operable means movable a first chosen amount out of its normal position to effect unseating of said normally seated valve, and effective when moved a second chosen amount greater than said first chosen amount out of its normal position to also effect said predetermined amount of movement of said stem thereby to cause unseating of said check valve for the purpose of causing reverse flow from the control reservoir to the brake pipe.

15. In a railway vehicle brake system of the type having a brake pipe charged to a certain normal pressure, a brake cylinder device, an auxiliary reservoir and a control reservoir each also charged to said certain normal pressure and a brake control valve device having means for effecting charging the auxiliary reservoir from the brake pipe and being operable in response to a reduction in the pressure in the brake pipe relative to the pressure in the control reservoir to effect the supply of fluid under pressure from the auxiliary reservoir to the brake cylinder device, the combination characterized by a combined control reservoir charging and release valve device comprising:
(a) a normally seated check valve for controlling flow in the direction from the brake pipe to the control reservoir,
(b) a first annular valve seat for said check valve,
(c) a first stem disposed on one side of said check valve and extending through said first annular valve seat,
(d) a movable abutment responsive to a chosen pressure in the control reservoir for effecting seating of said check valve on said first annular seat to close communication between the brake pipe and the control reservoir,
(e) a valve operable to effect the release of fluid under pressure from the control reservoir to atmosphere,
(f) a second annular valve seat for said valve,
(g) means normally biasing said valve into contact with said second annular valve seat,
(h) a second stem subject at one end to brake pipe pressure and having adjacent said one end a cam surface and a recess at one end of the cam surface and extending from the opposite end a portion of reduced diameter for contact with said valve, and
(i) manually operable means movable a first chosen distance to effect unseating of said valve from said second annular valve seat and movable a second chosen distance greater than said first chosen distance to, subsequent to effecting unseating of said valve, move said second stem in said one direction a distance sufficient to first cause said cam surface to contact the end of said first stem and effect unseating of said check valve and thereafter position said recess in alignment with the end of said first stem for, in the absence of brake pipe pressure acting on said second stem, locking said check valve in an unseated position.

16. The combination as claimed in claim 14, further characterized by resilient biasing means for biasing said valve into seating contact with said second annular valve seat.

17. The combination as claimed in claim 15, further characterized by a resilient means interposed between said movable abutment and said check valve, said resilient means providing relative movement of said movable abutment and said check valve each with respect to the other and also a biasing force acting in the direction of effect seating of said check valve on said annular valve seat.

References Cited by the Examiner
FOREIGN PATENTS 212,361 12/60 Austria.
510,936 6/55 Italy.

ARTHUR L. LA POINT, Primary Examiner.
EUGENE G. BOTZ, Examiner.